(12) United States Patent
Inoue

(10) Patent No.: US 10,544,848 B2
(45) Date of Patent: Jan. 28, 2020

(54) DYNAMIC DAMPER CONTROL DEVICE

(71) Applicant: HONDA MOTOR CO., LTD., Minato-ku, Tokyo (JP)

(72) Inventor: Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 15/846,323

(22) Filed: Dec. 19, 2017

(65) Prior Publication Data

US 2018/0180131 A1 Jun. 28, 2018

(30) Foreign Application Priority Data

Dec. 22, 2016 (JP) .................................. 2016-249010

(51) Int. Cl.
 *F16F 7/10* (2006.01)
 *F16F 1/36* (2006.01)
 *F16F 7/108* (2006.01)

(52) U.S. Cl.
 CPC .......... *F16F 7/1011* (2013.01); *F16F 1/3615* (2013.01); *F16F 7/108* (2013.01); *F16F 2222/06* (2013.01); *F16F 2224/025* (2013.01); *F16F 2228/066* (2013.01); *F16F 2230/18* (2013.01)

(58) Field of Classification Search
 CPC ........ F16F 7/1011; F16F 1/3615; F16F 7/108; F16F 2222/06; F16F 2224/025; F16F 2228/066; F16F 2230/18
 See application file for complete search history.

(56) References Cited

U.S. PATENT DOCUMENTS

| 2005/0011710 A1* | 1/2005 | Hitchcock | ............... | F16F 1/361 |
| | | | | 188/267.2 |
| 2010/0193304 A1* | 8/2010 | Bose | ....................... | F16F 9/145 |
| | | | | 188/267.2 |

FOREIGN PATENT DOCUMENTS

| CN | 105751847 | 7/2016 |
| JP | 2016-001008 | 1/2016 |
| JP | 2016-061377 | 4/2016 |
| WO | 2012026332 | 3/2012 |

OTHER PUBLICATIONS

Chinese Office Action and Search Report for Chinese Patent Application No. 201711403835.1 dated Apr. 29, 2019.
Japanese Office Action for Japanese Patent Application No. 2016-249010 dated Aug. 21, 2018.

* cited by examiner

*Primary Examiner* — Calvin Cheung
(74) *Attorney, Agent, or Firm* — Amin, Turocy & Watson, LLP

(57) ABSTRACT

The present invention relates to a dynamic damper control device. A control unit includes a first acceleration sensor configured to obtain a first acceleration of a mass member, a second acceleration sensor configured to obtain a second acceleration of a vibration control target member, and a target amplitude amplification ratio calculating unit configured to calculate a target amplitude amplification ratio of the mass member and the vibration control target member based on the first acceleration and the second acceleration, and is configured to change a magnetic force produced from an electromagnet based on the target amplitude amplification ratio.

11 Claims, 11 Drawing Sheets

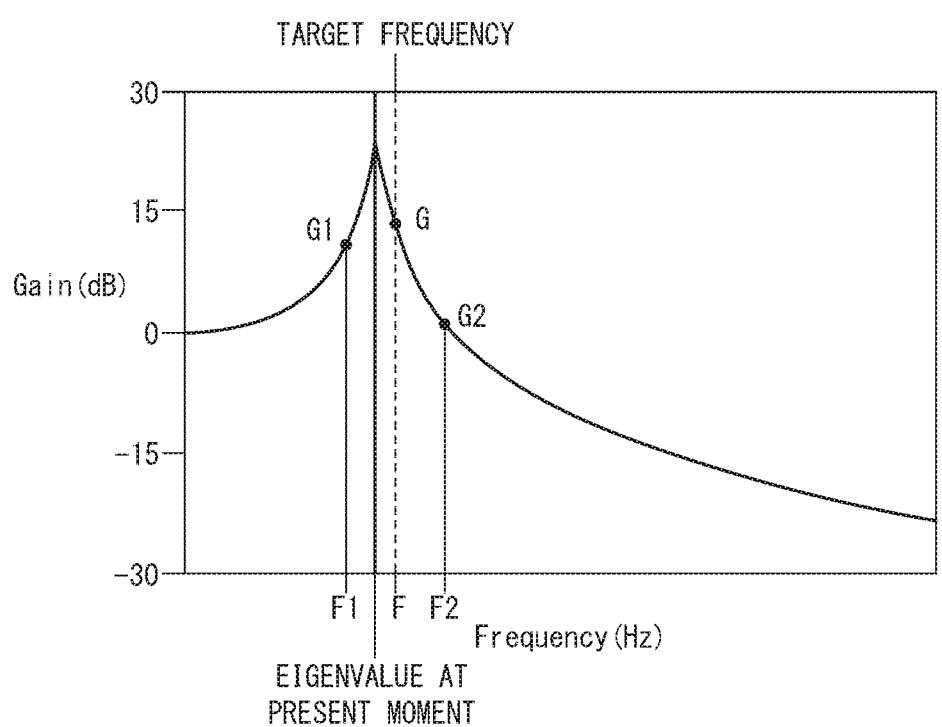

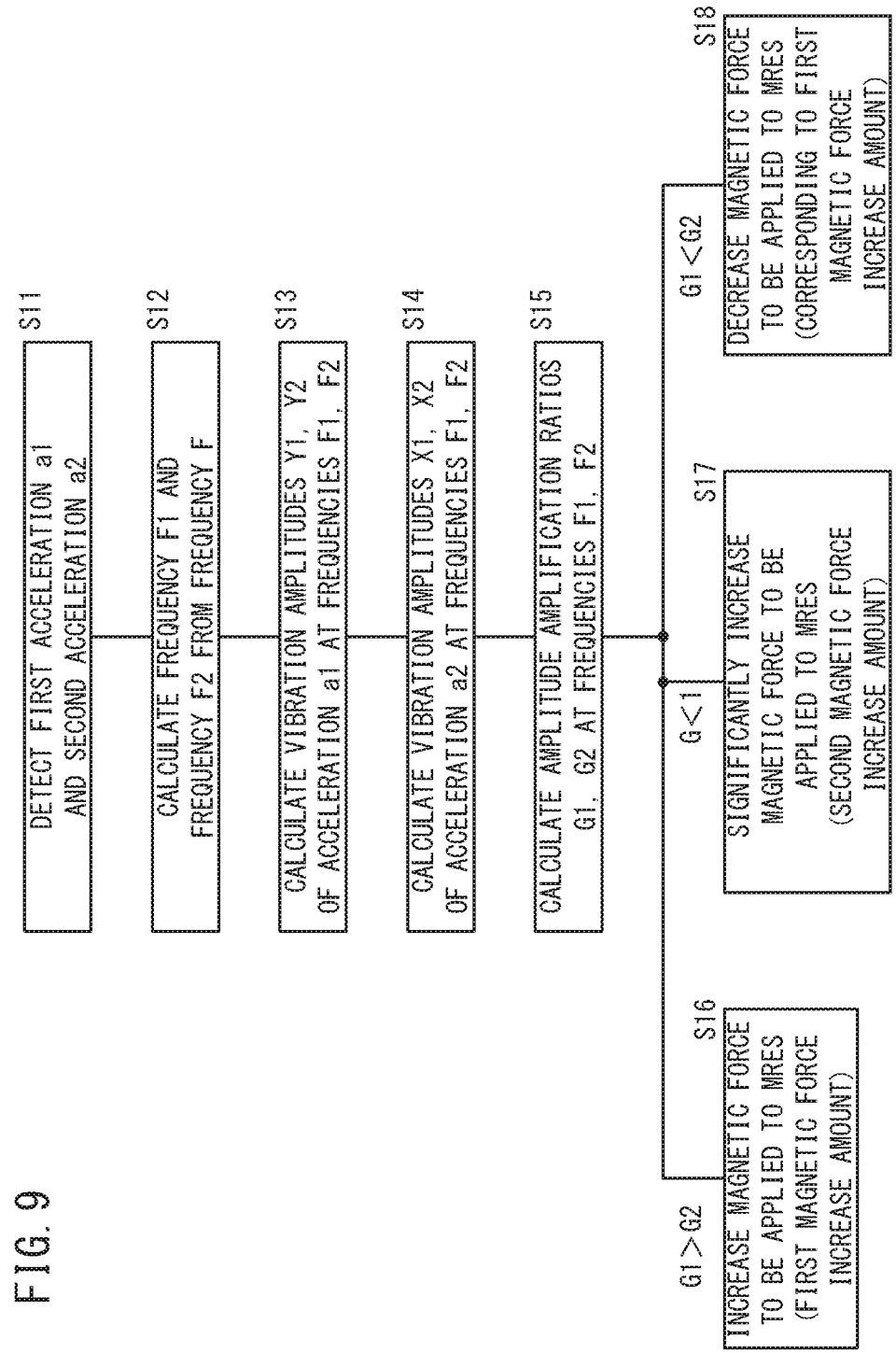

DYNAMIC DAMPER CONTROL DEVICE

CROSS-REFERENCE TO RELATED APPLICATION

This application is based upon and claims the benefit of priority from Japanese Patent Application No. 2016-249010 filed on Dec. 22, 2016, the contents of which are incorporated herein by reference.

BACKGROUND OF THE INVENTION

Field of the Invention

The present invention relates to a dynamic damper control device that suppresses vibration of a vibrating body.

Description of the Related Art

Conventionally, dynamic dampers (dynamic vibration absorbers) are widely used to reduce vibrations of machines. The dynamic dampers are constituted by a spring and a mass that have a natural frequency equal to a frequency of a problematic vibration and vibrate with a reverse phase with respect to the problematic vibration, and thus are used to reduce the problematic vibration using inertia of the mass as well.

In this regard, when the natural frequency is f, an eigenvalue is $\omega$, a spring constant is K, and the mass is M, the following relationship holds:

$$f = \omega/2\pi = (1/2\pi)\sqrt{(K/M)}.$$

A generally used dynamic damper vibrates with a reverse phase with respect to input vibrations at the natural frequency f determined based on a ratio of the spring constant K to the movable mass M, and uses inertia of the mass M to reduce the vibrations. Hence, it is necessary to have one dynamic damper for one problematic frequency. When a plurality of dynamic dampers are applied and the natural frequencies f of the dynamic dampers are close, the natural frequencies f interfere with each other and thus amplify vibrations in some cases rather than reducing the vibrations.

When engine vibrations are the cause of a problematic vibration noise and measures to reduce the noise are sought, there is a case where a problematic frequency changes in synchronization with an engine rotational speed and thus some problematic frequencies are present.

To deal with the situation, a dynamic damper that uses magnetorheological elastomers (MRE) for springs is proposed to realize a dynamic damper having a variable natural frequency f (see, for example, International Publication No. WO 2012/026332). Rigidity of rubber into which magnetic powders have been mixed becomes variable by controlling a magnitude of a magnetic field that is produced in the rubber by an electric current running through a coil.

A variable dynamic damper that uses the MRE is generally controlled by reading a current value from a correlation table showing the correlation between current values and rubber rigidity set in advance. However, a spring value of rubber changes due to, among other things, a temperature and changes also over time. In addition, variations of characteristics due to a production process become relatively significant. Therefore, it is difficult to stably and effectively obtain control stability and a control effect for a long period of time.

There is a method (see, for example, Japanese Laid-Open Patent Publication No. 2016-001008) that realizes a control method for changing and adjusting a frequency of a dynamic damper following a detected frequency, using a vibration detecting unit of a movable mass, a displacement detecting unit of a spring, and a frequency detecting unit (engine rotational speed signal, etc.) that determines a vibration reduction frequency.

This control method is shown below. That is, when acceleration is a and displacement of a spring (spring constant K) is X, an equation of motion of the mass M is expressed as $$Ma = -KX.$$

This equation is also written as $$a/X = -(K/M).$$

Meanwhile, the natural frequency f is $$f = (1/2\pi)\sqrt{(K/M)}.$$

That is, a ratio of a vibration acceleration of the movable mass to the displacement of the spring is a value proportional to a square of the natural frequency of the spring (spring constant K) at this moment. Based on this relation, $f^2$ and $|a/X|$ are compared successively for the detected natural frequency f of the engine. When $f^2$ is small, the spring constant K is increased by $\Delta K$ (a current to be applied to a coil is increased). When $f^2$ is large, the spring constant K is decreased by $\Delta K$.

SUMMARY OF THE INVENTION

However, when a dynamic damper composed of, for example, the MRE is adjusted to 200 Hz, since $$a/X = -(K/M) = -(2\pi f)^2$$

holds, a/X equals to approximately $1200^2$. That is, X takes a very small value compared to a, and is very difficult to realize with a low-cost microcomputer. This is because an accurate calculation is difficult to perform since the calculation may require the number of bits more than the microcomputer can handle.

The present invention aims to provide a dynamic damper control device that realizes a control method for changing and adjusting a frequency of a dynamic damper following a frequency (target frequency) of a problematic vibration by using a controller composed of a low-cost processor including a fixed-point arithmetic unit and makes a frequency of a dynamic damper quickly follow a target frequency.

[1] A dynamic damper control device according to a first aspect of the present invention is a dynamic damper control device including: a vibration control target member configured to vibrate according to a vibration source; an attachment member coupled to the vibration control target member; a magnetorheological elastomer configured to elastically couple the attachment member and a mass member; an electromagnet configured to produce a magnetic force applied to the magnetorheological elastomer; and an elastic characteristics control unit configured to control power supply to the electromagnet and control elastic characteristics of the magnetorheological elastomer, and the elastic characteristics control unit includes a first acceleration obtaining unit configured to obtain a first acceleration of the mass member, a second acceleration obtaining unit configured to obtain a second acceleration of the vibration control target member, and a target amplitude amplification ratio calculating unit configured to calculate a target amplitude amplification ratio of the mass member and the control vibration control target member based on the first acceleration and the second acceleration, and is configured to change the magnetic force produced from the electromagnet based on the target amplitude amplification ratio.

The target amplitude amplification ratio calculating unit preferably calculates a central amplitude amplification ratio.

Consequently, the first aspect of the present invention can realize the control method for changing and adjusting the frequency of the dynamic damper following a problematic vibration frequency (target frequency) by using a controller composed of a low-cost processor including a fixed-point arithmetic unit. Further, it is possible to make the frequency of the dynamic damper quickly follow the target frequency.

[2] According to the first aspect of the present invention, the elastic characteristics control unit may further include a target frequency determining unit configured to determine a target frequency based on a vibration state of the vibration source, and the target amplitude amplification ratio calculating unit may be configured to calculate the target amplitude amplification ratio at the target frequency.

The elastic characteristics control unit includes the target frequency determining unit that determines the target frequency based on the vibration state of the vibration source. Consequently, the elastic characteristics control unit can easily calculate the target amplitude amplification ratio of the mass member and the vibration control target member based on the first acceleration and the second acceleration.

[3] According to the first aspect of the present invention, the elastic characteristics control unit may further include a reference frequency determining unit configured to determine a first reference frequency and a second reference frequency based on the target frequency, and a reference amplitude amplification ratio calculating unit configured to calculate a first reference amplitude amplification ratio and a second reference amplitude amplification ratio at the first reference frequency and the second reference frequency based on the first acceleration and the second acceleration, and may be configured to change the magnetic force produced from the electromagnet based on the first reference amplitude amplification ratio and the second reference amplitude amplification ratio.

The elastic characteristics control unit can easily decide whether present eigenvalues (rigidity) of the MREs are smaller or larger than the target frequency, according to the relationship between the first reference amplitude amplification ratio and the second reference amplitude amplification ratio. Consequently, it is possible to easily control the magnetic force in a direction to increase or decrease an elasticity modulus of the magnetorheological elastomer. In this case, it is only necessary to calculate the first reference amplitude amplification ratio and the second reference amplitude amplification ratio, and obtain the relationship between these first reference amplitude amplification ratio and second reference amplitude amplification ratio. Consequently, it is possible to simplify signal processing.

[4] According to the first aspect of the present invention, the reference amplitude amplification ratio calculating unit may be configured to set the first reference frequency lower than the target frequency and set the second reference frequency higher than the target frequency, and the elastic characteristics control unit may be configured to, when the first reference amplitude amplification ratio is smaller than the target amplitude amplification ratio and the second reference amplitude amplification ratio is larger than the target amplitude amplification ratio, decrease the magnetic force produced from the electromagnet, and when the first reference amplitude amplification ratio is larger than the target amplitude amplification ratio and the second reference amplitude amplification ratio is smaller than the target amplitude amplification ratio, increase the magnetic force produced from the electromagnet.

When the current eigenvalues (rigidity) of the MREs are larger than the target frequency, the first reference amplitude amplification ratio is smaller than the target amplitude amplification ratio, and the second reference amplitude amplification ratio is larger than the target amplitude amplification ratio. Consequently, the elastic characteristics control unit can adjust the eigenvalues of the MREs to the target frequency by decreasing the magnetic force produced from the electromagnet.

By contrast, when the present eigenvalues (rigidity) of the MREs are smaller than the target frequency, the first reference amplitude amplification ratio is larger than the target amplitude amplification ratio, and the second reference amplitude amplification ratio is smaller than the target amplitude amplification ratio. Consequently, the elastic characteristics control unit can adjust the eigenvalues of the MREs to the target frequency by increasing the magnetic force produced from the electromagnet.

Consequently, it is possible to make the eigenvalue of the dynamic damper at a present moment quickly follow the target frequency F (target eigenvalue).

[5] According to the first aspect of the present invention, the elastic characteristics control unit may be configured to, when the first reference amplitude amplification ratio is smaller than a predetermined reference amplitude amplification ratio, increase the magnetic force produced from the electromagnet.

When the first reference amplitude amplification ratio is the predetermined reference amplitude amplification ratio (e.g., 1 (0 dB)), the current eigenvalues of the MREs are predicted to be significantly far from the target frequency. Consequently, the elastic characteristics control unit can make the eigenvalues of the MREs quickly follow the target frequency by increasing the magnetic force produced from the electromagnet.

[6] According to the first aspect of the present invention, the reference amplitude amplification ratio calculating unit may be configured to, when the first reference amplitude amplification ratio is larger than the target amplitude amplification ratio and the second reference amplitude amplification ratio is smaller than the target amplitude amplification ratio, increase the magnetic force produced by the electromagnet by a first magnetic force increase amount, and when the first reference amplitude amplification ratio is smaller than the predetermined reference amplitude amplification ratio, increase the magnetic force produced by the electromagnet by a second magnetic force increase amount, and the second magnetic force increase amount may be the first magnetic force increase amount or more.

Consequently, it is possible to make the eigenvalue of the dynamic damper at the present moment quickly follow the target frequency F (target eigenvalue).

[7] According to the first aspect of the present invention, the elastic characteristics control unit may be configured to, when the first reference amplitude amplification ratio and the second reference amplitude amplification ratio are smaller than the target amplitude amplification ratio or when the first reference amplitude amplification ratio and the second reference amplitude amplification ratio are larger than the target amplitude amplification ratio, maintain the magnetic force produced from the electromagnet.

Consequently, it is possible to suppress production of wasteful micro electric currents and reduce power consumption.

[8] A dynamic damper control device according to a second aspect of the present invention is a dynamic damper control device including: a vibration control target member configured to vibrate a vibration source; an attachment member coupled to the vibration control target member; a magnetorheological elastomer configured to elastically couple the attachment member and a mass member; an electromagnet configured to produce a magnetic force applied to the magnetorheological elastomer; and an elastic characteristics control unit configured to control power supply to the electromagnet and control elastic characteristics of the magnetorheological elastomer, and the elastic characteristics control unit includes a first acceleration obtaining unit configured to obtain a first acceleration of the mass member, a second acceleration obtaining unit configured to obtain a second acceleration of the vibration control target member, and a target frequency determining unit configured to determine a target frequency based on a vibration state of the vibration state, a reference frequency determining unit configured to determine a first reference frequency and a second reference frequency based on the target frequency, and a reference amplitude amplification ratio calculating unit configured to calculate a first reference amplitude amplification ratio and a second reference amplitude amplification ratio at the first reference frequency and the second reference frequency based on the first acceleration and the second acceleration, and is configured to change the magnetic force produced from the electromagnet based on the first reference amplitude amplification ratio and the second reference amplitude amplification ratio.

Consequently, the second aspect of the present invention can realize the control method for changing and adjusting the frequency of the dynamic damper following a problematic vibration frequency (target frequency) by using a controller composed of a low-cost processor including a fixed-point arithmetic unit. Further, it is possible to make the frequency of the dynamic damper quickly follow the target frequency.

It is not necessary to perform processing of calculating the target amplitude amplification ratio of the target frequency. It is only necessary to decide the relationship between the first reference amplitude amplification ratio and the second reference amplitude amplification ratio. Consequently, it is possible to simplify the signal processing and increase a response speed.

[9] According to the second aspect of the present invention, the reference amplitude amplification ratio calculating unit may be configured to set the first reference frequency lower than the target frequency and set the second reference frequency higher than the target frequency, and the elastic characteristics control unit may be configured to, when the first reference amplitude amplification ratio is smaller than the second reference amplitude amplification ratio, decrease the magnetic force produced from the electromagnet, and when the first reference amplitude amplification ratio is larger than the second reference amplitude amplification ratio, increase the magnetic force produced from the electromagnet.

[10] According to the second aspect of the present invention, the elastic characteristics control unit may be configured to, when the first reference amplitude amplification ratio is smaller than a predetermined reference amplitude amplification ratio, increase the magnetic force produced from the electromagnet.

[11] According to the second aspect of the present invention, the reference amplitude amplification ratio calculating unit may be configured to, when the first reference amplitude amplification ratio is larger than the second reference amplitude amplification ratio, increase the magnetic force produced by the electromagnet by a first magnetic force increase amount, and when the first reference amplitude amplification ratio is smaller than the predetermined reference amplitude amplification ratio, increase the magnetic force produced by the electromagnet by a second magnetic force increase amount, and the second magnetic force increase amount may be the first magnetic force increase amount or more.

The present invention can realize the control method for changing and adjusting the frequency of the dynamic damper following a problematic vibration frequency (target frequency) by using a controller composed of a low-cost processor including the fixed-point arithmetic unit. Further, it is possible to make the frequency of the dynamic damper quickly follow the target frequency.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a characteristic diagram showing one example where the relationship between amplitude amplification ratios G, G1, G2 is G1<G and G>G2.

FIG. 9 is a flowchart showing one example of a processing operation of the dynamic control device according to a second embodiment;

DESCRIPTION OF THE PREFERRED EMBODIMENTS

Embodiments of a dynamic damper control device according to the present invention will be described below with reference to FIGS. 1 to 11B.

Figure 1:
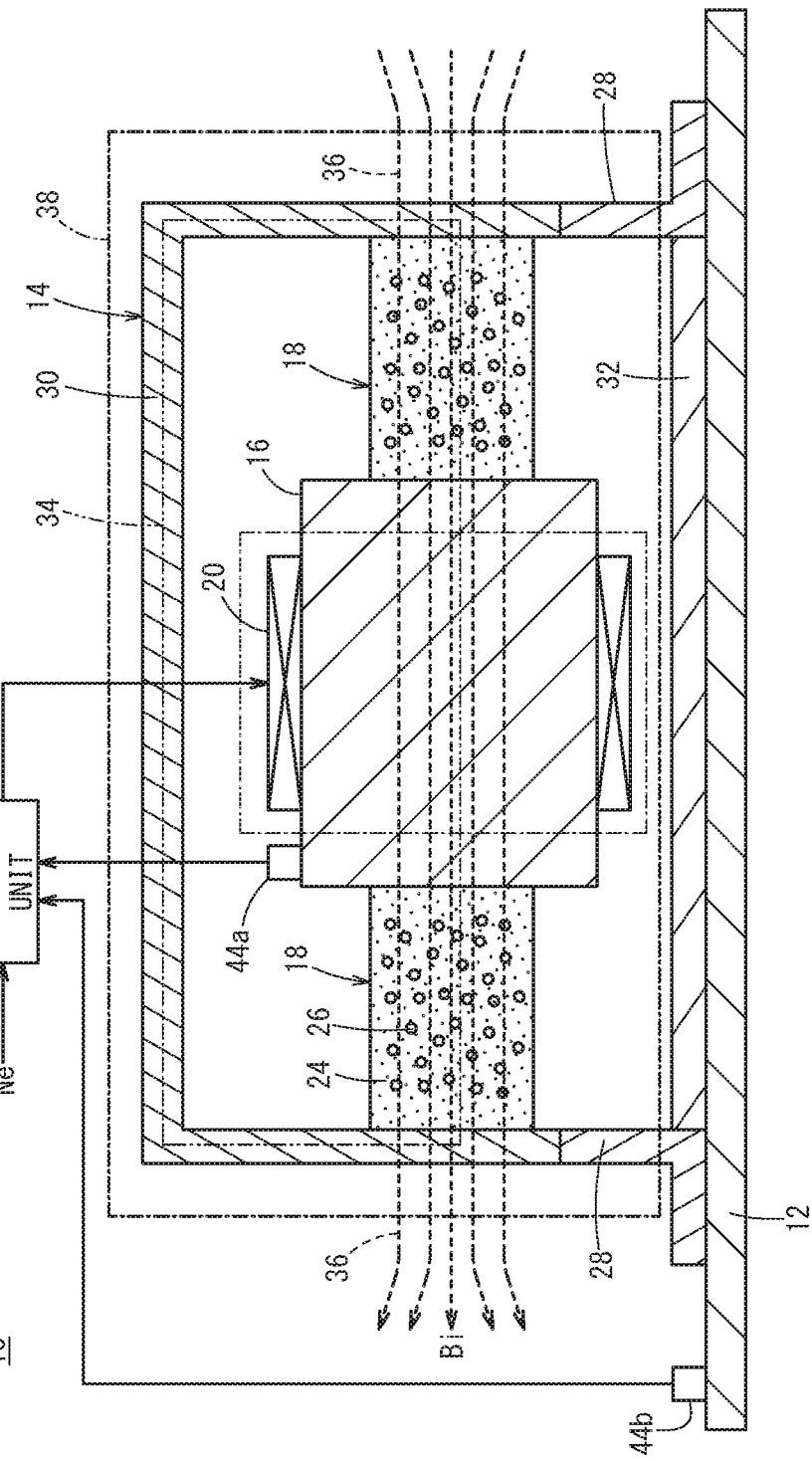
FIG. 1 is a cross-sectional view of a schematic configuration of a dynamic damper control device according to the present embodiment.

A dynamic damper control device 10 according to the present embodiment is attached to a vibration transmission path of a vibration control target member 12 as shown in FIG. 1. The vibration control target member 12 is, for example, a subframe on which an engine (not shown) is installed in the case of, for example, a vehicle.

The dynamic damper control device 10 includes an attachment member 14 that is coupled to the vibration control target member 12, magnetorheological elastomers (hereinafter referred to as MREs 18) that elastically couple the attachment member 14 and a mass member 16, an electromagnet 20 that produces a magnetic force applied to the MREs 18, and a control unit 22 (elastic characteristics control unit) that controls elastic characteristics of the MREs 18 by controlling power supply to the electromagnet 20.

Each of the MREs 18 includes a matrix elastomer 24 (elastic material) that has viscoelasticity as a matrix, and multiple conductive magnetic particles 26 that are dispersed in the matrix elastomer 24. The conductive magnetic particles 26 are dispersed inside, an elasticity modulus changes according to a magnitude of a magnetic field Bi to be applied, and an electrical resistance value in a predetermined direction changes in accordance with deformation.

A constituent material of the matrix elastomer 24 is, for example, a known polymer material such as silicone rubber having viscoelasticity at a room temperature.

A constituent material of the magnetic particles 26 includes iron, iron nitride, iron carbide, carbonyl iron, magnetic iron oxides, ferrites, nickel, cobalt, alloys of cobalt iron, magnetite, and goethite. An average particle diameter of the magnetic particles 26 is, for example, less than 50 μm.

The attachment member 14 includes, for example, a pair of brackets 28, and a yoke member 30 fixed on the pair of brackets 28.

The pair of brackets 28 are formed of a non-magnetic material or a magnetic material (such as iron), having, for example, L-shaped cross sections, and are integrally fixed to the vibration control target member 12 with an unillustrated proper fixing unit (such as bolts or welding). Additionally, as shown in FIG. 1, the member 32 that connects the pair of these brackets 28 may be integrally or separately provided between the pair of brackets 28.

The yoke member 30 is configured to be fixed on the pair of brackets 28 and surround a side portion and an upper portion of a structure formed by the mass member 16 and the MREs 18. This yoke member 30 is made of a magnetic material (such as iron). Thus, the magnetic field Bi to be applied forms a closed magnetic circuit 34 (indicated by a two-dot-dashed line) which is a path of the mass member 16→the MRE 18→the yoke member 30→the MRE 18→the mass member 16. That is, the attachment member 14 adopts such a structure that the yoke member 30 surrounds the side portion and the upper portion of the structure to prevent leakage of magnetic fluxes.

As described above, the pair of brackets 28 can be made of a non-magnetic material or a magnetic material. However, when the vibration control target member 12 is made of the magnetic material, use of the pair of brackets 28 made of the magnetic material could cause leakage and spreading of magnetic field lines toward the vibration control target member 12. Thus, losses during the displacement of the MREs 18 will result. Hence, when the vibration control target member 12 is made of the magnetic material, the pair of brackets 28 are preferably made of the non-magnetic material.

The mass member 16 is supported by the vibration control target member 12 via the MREs 18 and the attachment member 14. The mass member 16 includes outer surfaces that face towards the opposite direction, and spans the pair of MREs 18 when the MREs 18 are bonded to the outer surfaces. In the present embodiment, the mass member 16 is swingable in upper and lower directions. Therefore, the upper and lower directions are a vibration control direction.

Meanwhile, the electromagnet 20 applies the magnetic field Bi to the MREs 18 by electric power supplied from the control unit 22. The magnitude of the magnetic field Bi to be applied is changeable according to a drive current out of the supplied power. Windings of the electromagnet 20 surround the mass member 16. The axis of the windings is disposed to match the axis of the MREs 18.

The power supply to the electromagnet 20 produces the magnetic field Bi, which is applied to the MREs 18. The magnetic field Bi is generated as indicated by broken lines in FIG. 1 where magnetic field lines 36 goes from the one MRE 18 to the other MRE 18. The magnetic field Bi produced by the electromagnet 20 changes according to the drive current flowing in the electromagnet 20. When the drive current becomes greater, the intensity of the magnetic field Bi to be produced becomes higher.

When the power supply to the electromagnet 20 produces and applies the magnetic field Bi to the MREs 18, the magnetic particles 26 are polarized according to the magnitude of the magnetic field Bi and form magnetic connections. The magnetic particles 26 are coupled one after another to form, for example, a mesh structure, the elasticity modulus of the MREs 18 increases more than the elasticity modulus (rigidity) of the matrix elastomers 24. When the magnitude of the magnetic field Bi to be applied to the MREs 18 is larger, the magnetic connections between the magnetic particles 26 increase and consequently the elasticity modulus of the MREs 18 increase. Hence, when the drive current supplied to the electromagnet 20 is larger, the elasticity modulus of the MREs 18 increases and the MREs 18 do not easily deform in response to a load.

Figure 2:
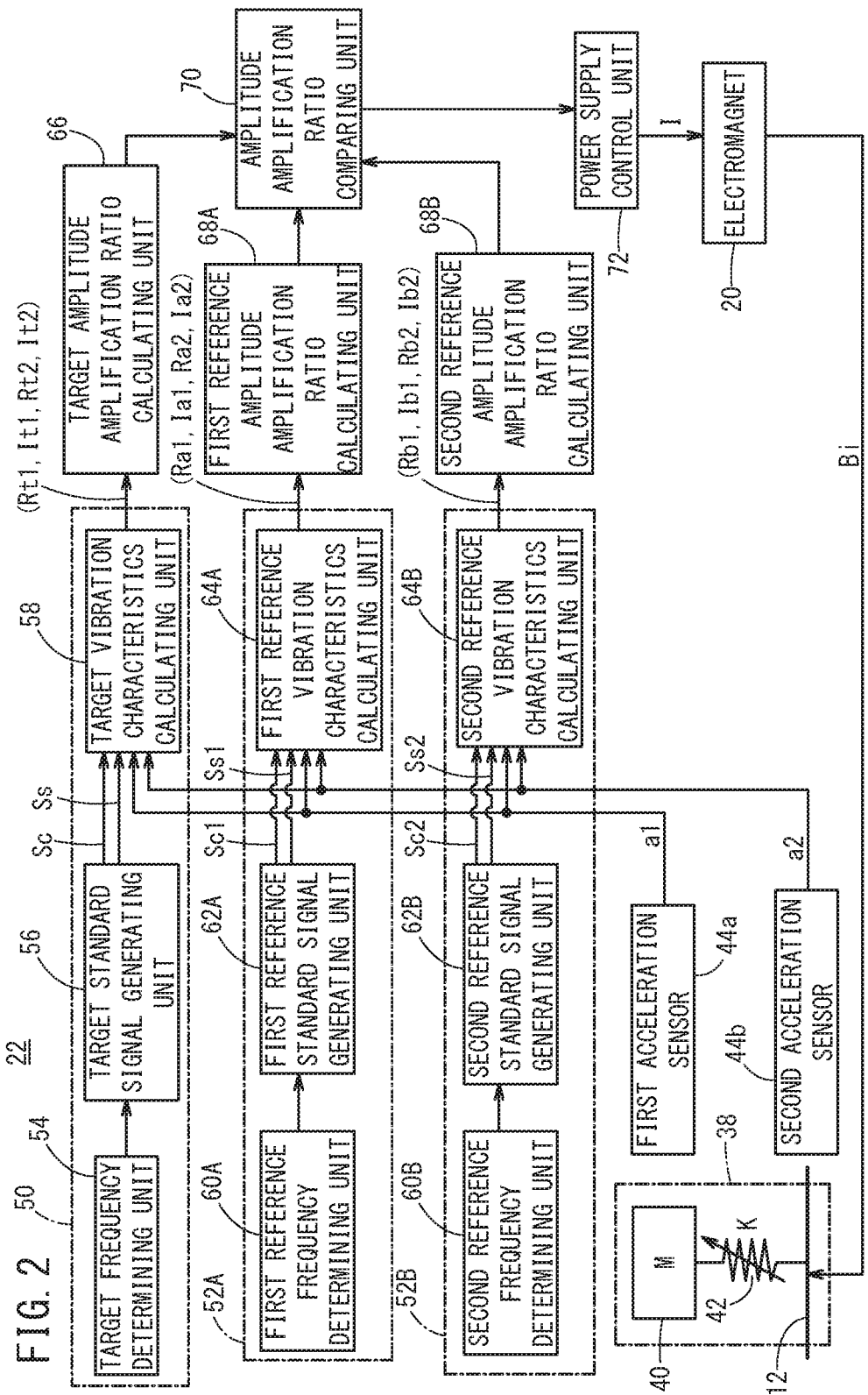
FIG. 2 is a block diagram showing a schematic configuration of the dynamic damper control device.

The above-described attachment member 14, the pair of MREs 18, and the mass member 16 form a dynamic damper 38. As schematically shown in FIG. 2, the dynamic damper 38 employs a configuration where a movable mass 40 is connected onto the vibration control target member 12 via a spring 42. In this regard, the movable mass 40 corresponds to the mass member 16, and the spring 42 corresponds to the MREs 18.

When a mass of the movable mass 40 is M and a spring constant of the spring 42 is K, a resonance frequency f of the dynamic damper 38 constituted by the movable mass 40 and the spring 42 in FIG. 2 is given by $$f=(1/2\pi)\sqrt{(K/M)}.$$

In terms of the structure, the dynamic damper 38 vibrates in a reverse phase against a vibration frequency fc of the vibration control target member 12, and uses inertia of the movable mass 40 to reduce vibrations of the vibration control target member 12. Particularly, since the control unit 22 changes the elasticity modulus of the MREs 18 as described above, even when the vibration frequency fc of the vibration control target member 12 changes, it is possible to adjust the resonance frequency f of the dynamic damper 38 to match the vibration frequency fc.

The control unit 22 is configured as a LSI device or an embedded electronic device in which a microprocessor, ROM, and RAM are integrated, and is fixed to an appropriate position in, for example, a dashboard.

As described above, the control unit 22 supplies power to the electromagnet 20 and changes an electric current I in order to change the magnitude of the magnetic field Bi produced by the electromagnet 20. The magnitude of the electric current I supplied from the control unit 22 to the electromagnet 20 is preferably continuously changeable.

A principle of control of power supply to the electromagnet 20 by the control unit 22 will be described succinctly with reference to FIGS. 2 to 8.

First, when the mass of the movable mass 40 is M, an acceleration is a1 and displacement of the spring (spring constant K) is X, an equation of motion for the movable mass 40 is $$Ma1=-KX,$$

i.e., $$a1/X=-K/M.$$

On the other hand, the natural frequency f is $$f=(\tfrac{1}{2}\pi)\sqrt{(K/M)}.$$

When, for example, the mass M of the movable mass 40 is 0.8 kg, the spring constant (rigidity) K of the spring 42 is 500 N/mm, the natural frequency f is approximately 120 Hz.

Figure 3:
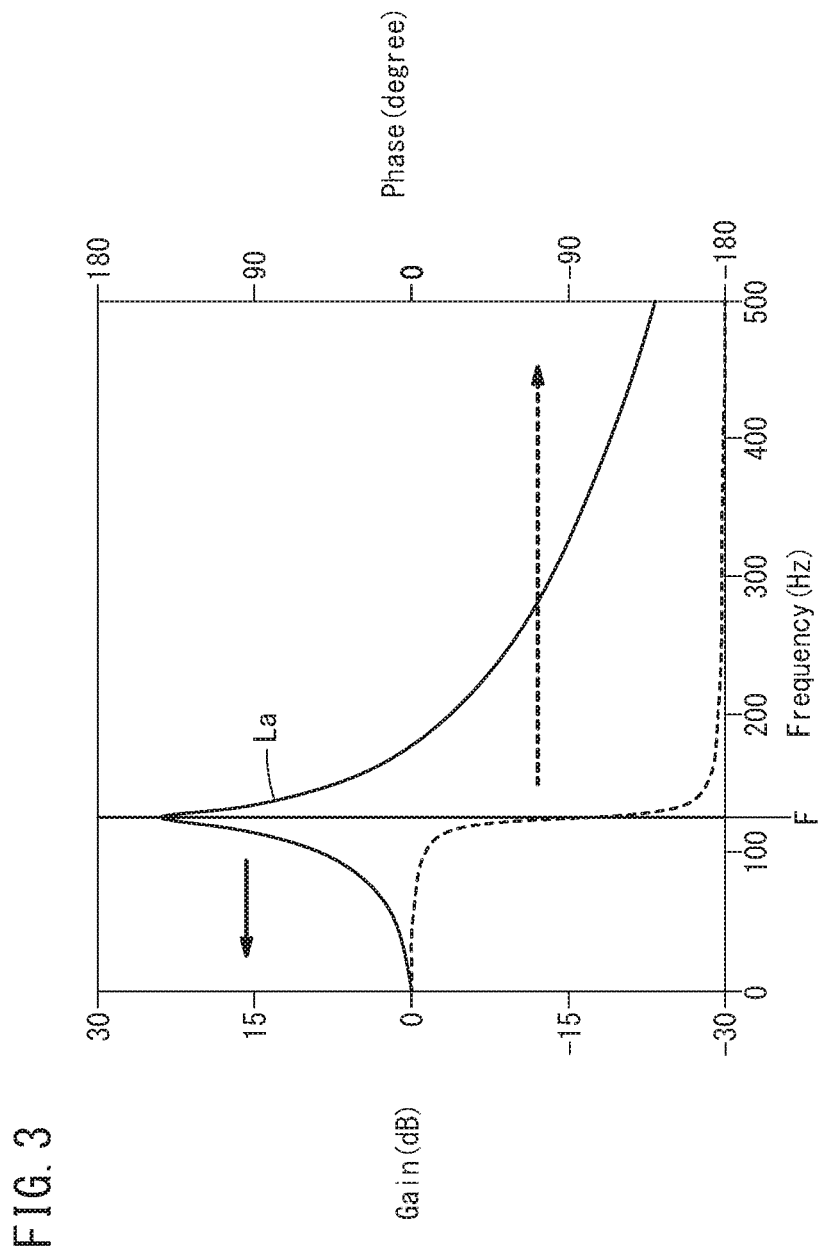
FIG. 3 is a view showing a result obtained by performing frequency analysis on a ratio (a1/a2) of an acceleration (first acceleration a1) of a movable mass to an acceleration (second acceleration a2) of a vibration control target member.

FIG. 3 shows a result obtained by performing frequency analysis on a ratio (a1/a2) of the acceleration (first acceleration a1) of the movable mass 40 to the acceleration (second acceleration a2) of the vibration control target member 12.

As indicated by a curve La in FIG. 3, a gain (amplitude amplification ratio) comes to a peak at around 120 Hz that is the natural frequency f, and the phase is 90°. That is, when the spring 42 that supports the movable mass 40 provides low attenuation, there is an eigenvalue (natural frequency) at around the phase 90°. Hence, by taking the following procedure, it is possible to learn how the eigenvalue of the dynamic damper 38 needs to be controlled.

That is, the two accelerations a1 and a2 are detected, frequencies of two detection signals are analyzed, and a ratio (gain:amplitude amplification ratio) is calculated. A frequency at which a gain comes to a peak or a frequency at which a phase difference becomes −90° is derived and compared with the target frequency F detected based on an engine rotational speed Ne. This means that it is possible to learn how the eigenvalue of the dynamic damper 38 needs to be controlled.

However, when FFT (Fast Fourier Transform) or the like is used, an arithmetic operation load becomes relatively high, and therefore it is difficult to realize the above procedure with an inexpensive processor.

Hence, in the present embodiment, as described below, the above procedure is realized by a simple method.

First, a first method (first embodiment) will be described with reference to FIGS. 4 to 8.

(1-a) A first acceleration sensor 44a detects the acceleration (first acceleration a1) of the movable mass 40. A second acceleration sensor 44b detects the acceleration (second acceleration a2) of the vibration control target member 12 (step S1 in FIG. 4).

(1-b) The target frequency F is calculated from the engine rotational speed Ne. A first reference frequency F1 (=F−ΔF) and a second reference frequency F2 (=F+ΔF) are calculated based on the target frequency F (step S2).

(1-c) Vibration amplitudes Y, Y1, Y2 of the first acceleration a1 at the target frequency F, the first reference frequency F1, and the second reference frequency F2 are calculated from a vibration waveform of the first acceleration a1 (step S3).

(1-d) Vibration amplitudes X, X1, X2 of the second acceleration a2 at the target frequency F, the first reference frequency F1, and the second reference frequency F2 are calculated from a vibration waveform of the second acceleration a2 (step S4).

(1-e) A target amplitude amplification ratio G (Y/X), a first reference amplitude amplification ratio G1 (Y1/X1), and a second reference amplitude amplification ratio G2 (Y2/X2) at the target frequency F, the first reference frequency F1, and the second reference frequency F2 are calculated (step S5).

(1-f) A current to be applied to a coil is adjusted according to a relationship among the amplitude amplification ratios G, G1, G2 with the rigidity of the MREs being increased or decreased by a small amount (steps S6 to S9).

By employing the above method, it is possible to make the eigenvalue of the dynamic damper 38 that uses the MREs 18 follow the target frequency F calculated from the engine rotational speed Ne.

A specific example of processing in above (1-f) will be described with reference to FIGS. 5A to 6.

Figure 4:
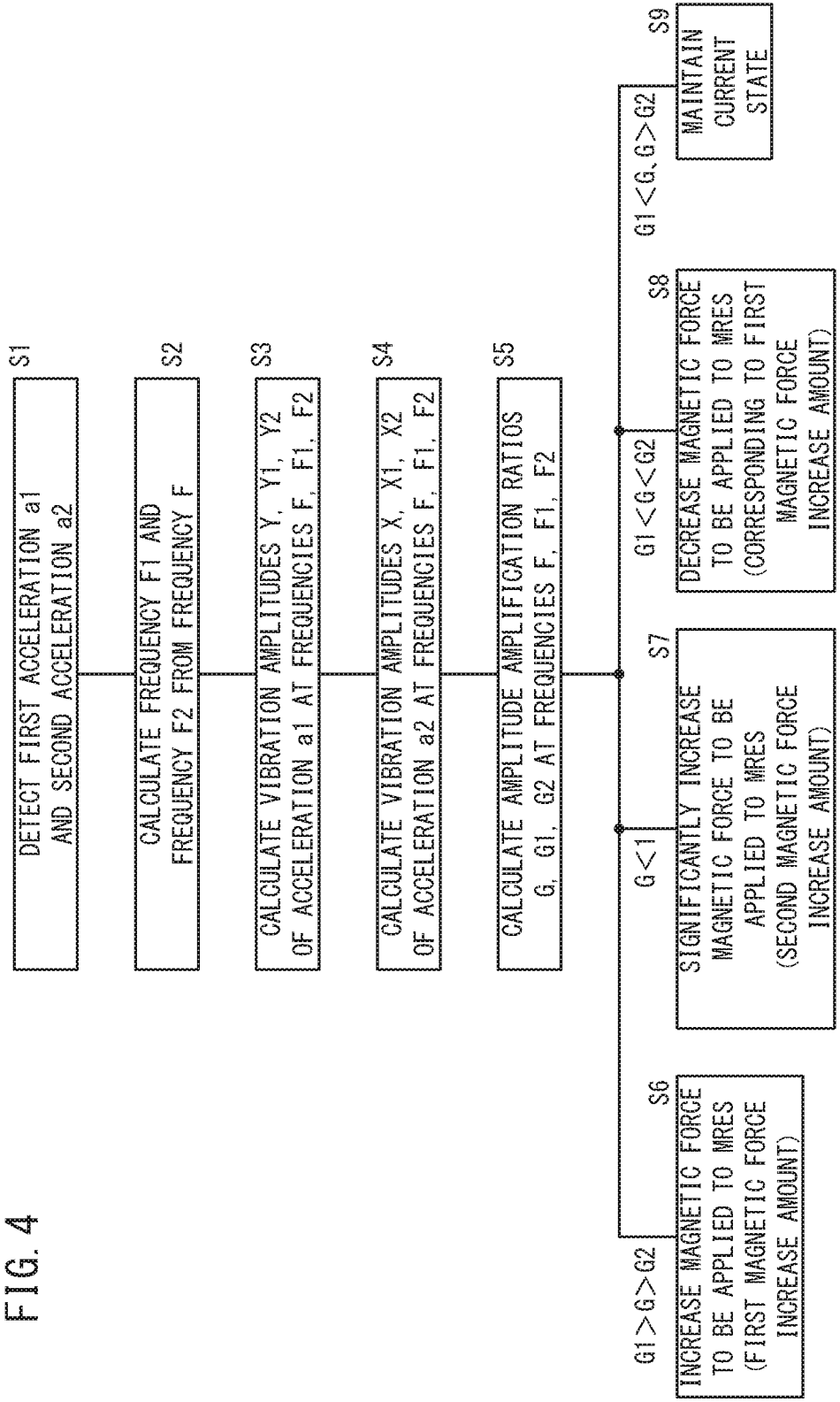
FIG. 4 is a flowchart showing an example of a processing operation of the dynamic damper control device according to the first embodiment.
Figure 5A:
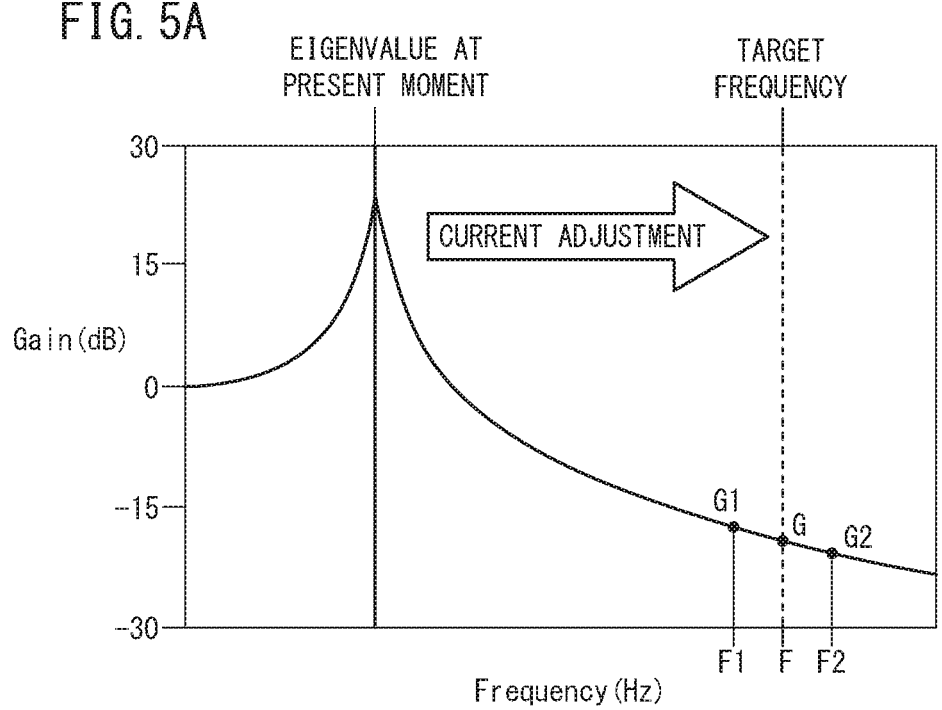
FIG. 5A is a characteristic diagram showing one example where a relationship between amplitude amplification ratios G, G1, G2 is G1>G>G2.

First, when the relationship among the amplitude amplification ratios G, G1, G2 is G1>G>G2 as shown in FIG. 5A, the present eigenvalues (rigidity) of the MREs are smaller than the target frequency F. Therefore, the current to be applied to the coil is adjusted such that the eigenvalues of the MREs 18 are increased by a small amount (step S6 in FIG. 4). In this case, the magnetic force produced by the electromagnet 20 is increased by a first magnetic force increase amount. Hence, a step size parameter "μ" of a filter coefficient (see FIG. 7) described below is set larger (e.g., μ=0.4 to 0.5) according to the relationship above.

In the case of G1<1 (0 dB) in particular, the present eigenvalues of the MREs 18 are predicted to be significantly far from the target frequency F. Therefore, the electric current to be applied to the coil is adjusted such that the eigenvalues of the MREs 18 are increased by a sufficiently large amount (step S7 in FIG. 4). In this case, the magnetic force produced by the electromagnet 20 is increased by a second magnetic force increase amount. The second magnetic force increase amount is equal to the first magnetic force increase amount or more. Hence, the step size parameter "μ" of the filter coefficient (see FIG. 7) described below is set smaller (e.g., μ=0.1 to 0.2) according to the relationship above.

Figure 5B:
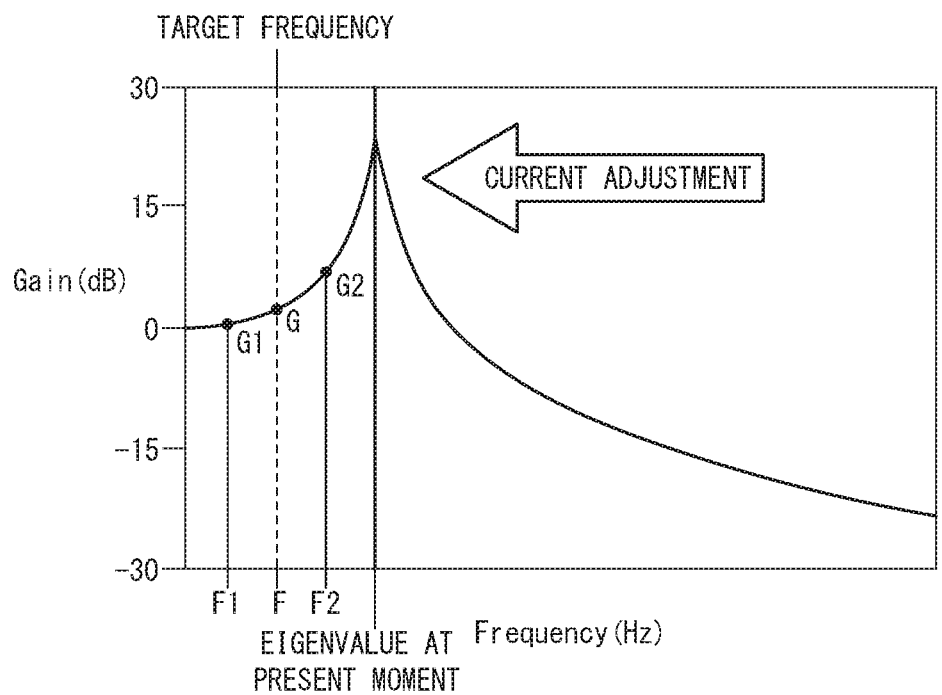
FIG. 5B is a characteristic diagram showing one example where the relationship between the amplitude amplification ratios G, G1, G2 is G1<G<G2.

When the relationship among the amplitude amplification ratios G, G1, G2 is G1<G<G2 as shown in FIG. 5B, the present eigenvalues (rigidity) of the MREs 18 are larger than the target frequency F. Therefore, the current to be applied to the coil is adjusted such that the eigenvalues of the MREs 18 are decreased by a small amount (step S8 in FIG. 4). In this case, the magnetic force produced by the electromagnet 20 is decreased by an amount corresponding to the first magnetic force increase amount.

When the relationship among the amplitude amplification ratios G, G1, G2 is G1<G and G>G2 as shown in FIG. 6, the present eigenvalues (rigidity) of the MREs 18 are maintained (step S9 in FIG. 4).

Next, one configuration example of the control unit 22 will be described with reference to FIG. 2. FIG. 2 shows a model of the dynamic damper 38.

The control unit 22 includes the first acceleration sensor 44a that obtains the first acceleration a1 of the mass member 16 that is the movable mass 40, and the second acceleration sensor 44b that obtains the second acceleration a2 of the subframe that is the vibration control target member 12.

The first acceleration sensor 44*a* is attached to, for example, an upper surface of the mass member 16 as shown in FIG. 1, and detects the first acceleration a1 in the vibration direction (the vertical direction in the present embodiment) of the mass member 16.

The second acceleration sensor 44*b* is attached to, for example, an upper surface of the vibration control target member 12, and detects the second acceleration a2 in the vibration direction (the vertical direction in the present embodiment) of the vibration control target member 12.

The control unit 22 includes a target signal processing unit 50, a first standard signal processing unit 52A, and a second standard signal processing unit 52B.

The target signal processing unit 50 includes a target frequency determining unit 54 that determines the target frequency F from a vibration state of the engine that is the vibration source, a target standard signal generating unit 56, and a target vibration characteristics calculating unit 58.

The target standard signal generating unit 56 generates a real part standard signal Sc ($=\cos(\omega t)$) and an imaginary part standard signal Ss ($=\sin(\omega t)$) of the target frequency F (or $\omega=2\pi F$) based on the target frequency F from the target frequency determining unit 54.

The target vibration characteristics calculating unit 58 calculates vibration characteristics (Rt1, It1, Rt2, It2) of the target frequency F related to the first acceleration a1 and the second acceleration a2 based on the real part standard signal Sc and the imaginary part standard signal Ss generated by the target standard signal generating unit 56.

The first standard signal processing unit 52A includes a first reference frequency determining unit 60A that determines the first reference frequency F1 (target frequency F−ΔF), a first reference standard signal generating unit 62A, and a first reference vibration characteristics calculating unit 64A.

The first reference standard signal generating unit 62A generates a first real part standard signal Sc1 ($=\cos(\omega t-\Delta\omega)$) and a first imaginary part standard signal Ss1 ($=\sin(\omega t-\Delta\omega)$) of the first reference frequency F1 based on the first reference frequency F1 from the first reference frequency determining unit 60A.

The first reference vibration characteristics calculating unit 64A calculates vibration characteristics (Ra1, Ia1, Ra2, Ia2) of the first reference frequency F1 related to the first acceleration a1 and the second acceleration a2 based on the first real part standard signal Sc1 and the first imaginary part standard signal Ss1 from the first reference standard signal generating unit 62A.

The second standard signal processing unit 52B includes a second reference frequency determining unit 60B that determines the second reference frequency F2 (target frequency F+ΔF), the second reference standard signal generating unit 62B, and the second reference vibration characteristics calculating unit 64B.

The second reference standard signal generating unit 62B generates a second real part standard signal Sc2 ($=\cos(\omega t+\Delta\omega)$) and a second imaginary part standard signal Ss2 ($=\sin(\omega t+\Delta\omega)$) of the second reference frequency F2 based on the second reference frequency F2 from the second reference frequency determining unit 60B.

The second reference vibration characteristics calculating unit 64B calculates vibration characteristics (Rb1, Ib1, Rb2, Ib2) of the second reference frequency F2 related to the first acceleration a1 and the second acceleration a2 based on the second real part standard signal Sc2 and the second imaginary part standard signal Ss2 from the second reference standard signal generating unit 62B.

The control unit 22 further includes a target amplitude amplification ratio calculating unit 66, a first reference amplitude amplification ratio calculating unit 68A, a second reference amplitude amplification ratio calculating unit 68B, an amplitude amplification ratio comparing unit 70, and a power supply control unit 72. These components will be described below.

Figure 7:
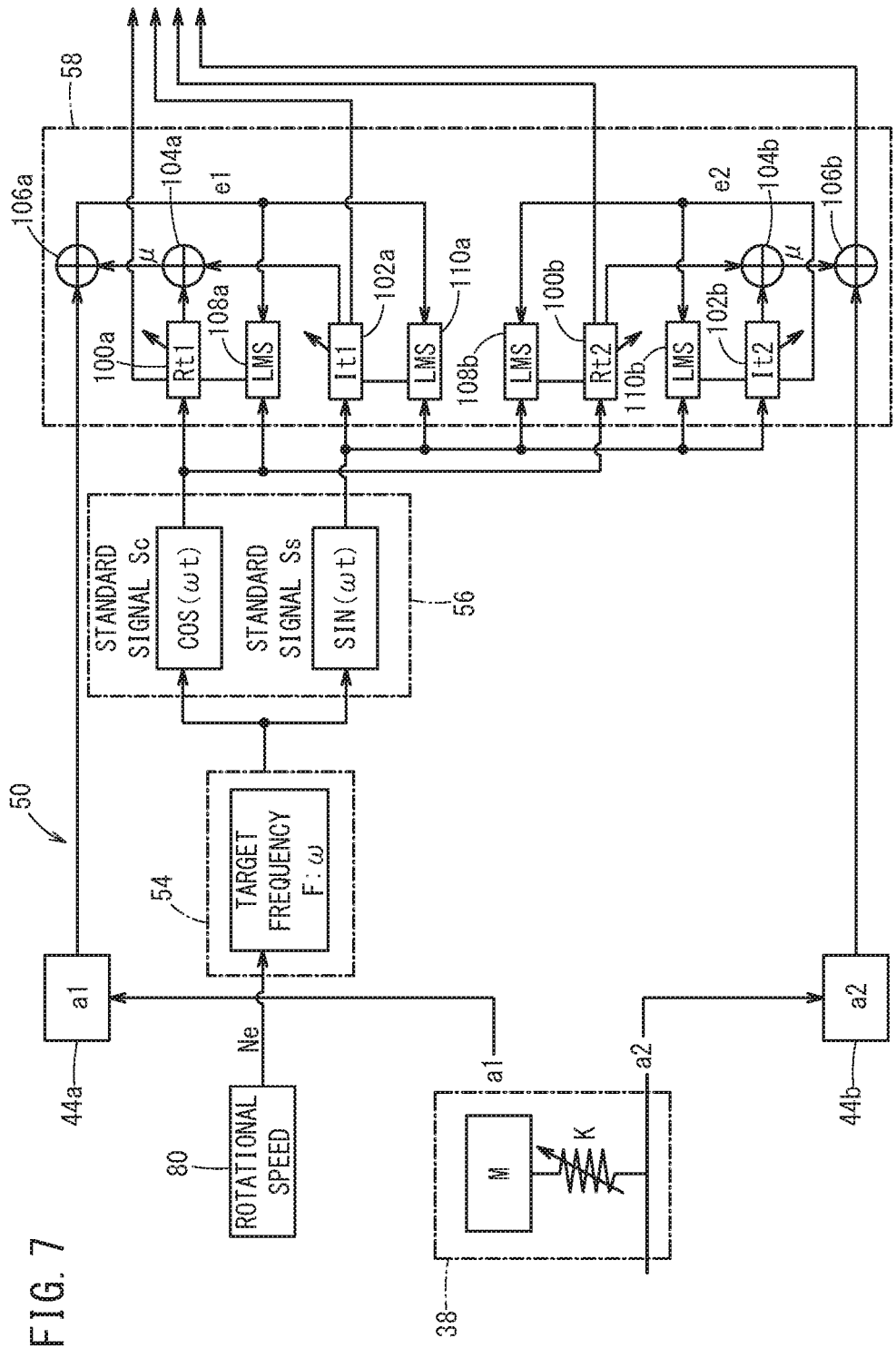
FIG. 7 is a block diagram showing a specific configuration example of a target signal processing unit of a control unit of the dynamic damper control device.

Hereinafter, a configuration of the target signal processing unit 50 will be described with reference to FIG. 7 as a representative example. In this regard, the first standard signal processing unit 52A and the second standard signal processing unit 52B employ the substantially same configuration as the configuration of the target signal processing unit 50, and therefore the description thereof will be omitted.

The target frequency determining unit 54 of the control unit 22 determines a target frequency F ($\omega$) based on the engine rotational speed Ne from a rotational speed sensor 80 that detects the engine rotational speed Ne. A method for determining the target frequency F includes a method for calculating predetermined arithmetic equations in which the engine rotational speed Ne is a variable, and a method for obtaining a correspondence map between the target frequency F and the engine rotational speed Ne derived from simulations or experiments. Different predetermined arithmetic equations and correspondence maps are used for different car models because of subframe materials, coupling structures from the engine to the subframe, and the like.

The target standard signal generating unit 56 generates the real part standard signal Sc ($=\cos(\omega t)$) and the imaginary part standard signal Ss ($=\sin(\omega t)$) of the target frequency F (or $\omega=2\pi F$) based on the target frequency F from the target frequency determining unit 54.

The target vibration characteristics calculating unit 58 includes a first real part application filter 100*a* to which the first real part filter coefficient Rt1 related to the first acceleration a1 is set based on at least the real part standard signal Sc, a filter imaginary part application filter 102*a* to which the first imaginary part filter coefficient It1 related to the first acceleration a1 is set based on at least the imaginary part standard signal Ss, and a first synthesizing unit 104*a* that synthesizes the set first real part filter coefficient Rt1 and first imaginary part filter coefficient It1. This first synthesizing unit 104*a* outputs a target frequency component composed of the first real part filter coefficient Rt1 and the first imaginary part filter coefficient It1.

This target vibration characteristics calculating unit 58 further includes a first subtracting unit 106*a*, a first real part filter coefficient updating unit 108*a*, and a first imaginary part filter coefficient updating unit 110*a*.

The first subtracting unit 106*a* subtracts a target frequency component obtained from the first synthesizing unit 104*a*, from the target frequency component included in the first acceleration a1 obtained from the first acceleration sensor 44*a*, and outputs a first error signal e1.

The first real part filter coefficient updating unit 108*a* receives an input of the real part standard signal Sc and the first error signal e1. The first imaginary part filter coefficient updating unit 110*a* receives an input of the imaginary part standard signal Ss and the first error signal e1.

The first real part filter coefficient updating unit 108*a* and the first imaginary part filter coefficient updating unit 110*a* update the first real part filter coefficient Rt1 and the first imaginary part filter coefficient It1 according to, for example, a LMS (least mean square) algorithm to minimize the first error signal e1 from the first subtracting unit 106a, i.e., to minimize the target frequency component included in the first acceleration a1.

The first real part filter coefficient updating unit 108a updates the first real part filter coefficient Rt1 according to the arithmetic equation below.

$Rt1_{n+1} = Rt1_n - \mu e1 \cos(\omega t)$

The first imaginary part filter coefficient updating unit 110a updates the first imaginary part filter coefficient It1 according to the arithmetic equation below.

$It1_{n+1} = It1_n - \mu e1 \sin(\omega t)$

"μ" in each of the arithmetic equations above is a positive real number smaller than 1 and is called a step size parameter.

Similar to the above, the target vibration characteristics calculating unit 58 includes a second real part application filter 100b to which the second real part filter coefficient Rt2 related to the second acceleration a2 is set based on at least the real part standard signal Sc, a second imaginary part application filter 102b to which the second imaginary part filter coefficient It2 related to the second acceleration a2 is set based on at least the imaginary part standard signal Ss, and a second synthesizing unit 104b that synthesizes the set second real part filter coefficient Rt2 and second imaginary part filter coefficient It2. This second synthesizing unit 104b outputs a target frequency component composed of the second real part filter coefficient Rt2 and the second imaginary part filter coefficient It2.

This target vibration characteristics calculating unit 58 includes a second subtracting unit 106b, a second real part filter coefficient updating unit 108b, and a second imaginary part filter coefficient updating unit 110b.

The second subtracting unit 106b subtracts the target frequency component obtained from the second synthesizing unit 104b, from the target frequency component included in the second acceleration a2 obtained from the second acceleration sensor 44b, and outputs a second error signal e2.

The second real part filter coefficient updating unit 108b receives an input of the real part standard signal Sc and the second error signal e2. The second imaginary part filter coefficient updating unit 110b receives an input of the imaginary part standard signal Ss and the second error signal e2.

The second real part filter coefficient updating unit 108b and the second imaginary part filter coefficient updating unit 110b update the second real part filter coefficient Rt2 and the second imaginary part filter coefficient It2 according to, for example, the LMS algorism to minimize the second error signal e2 from the second subtracting unit 106b, i.e., to minimize the target frequency component included in the second acceleration a2.

The target amplitude amplification ratio calculating unit 66 in FIG. 2 calculates a first target amplitude At1 of the first acceleration a1 and a second target amplitude At2 of the second acceleration a2 based on the vibration characteristics (Rt1, It1, Rt2, It2) from the target vibration characteristics calculating unit 58, and calculates the target amplitude amplification ratio G=At1/At2 based on these amplitudes. In this case, the first target amplitude At1 is $At1 = \sqrt{(Rt1^2 + It1^2)}$. The second target amplitude At2 is $At2 = \sqrt{(Rt2^2 + It2^2)}$. Naturally, $G = At1^2/At2^2$ may be used for the target amplitude amplification ratio G. In this case, $At1^2 = Rt1^2 + It1^2$ and $At2^2 = Rt2^2 + It2^2$ hold. Consequently, it is possible to omit an arithmetic operation of the square root.

The first reference amplitude amplification ratio calculating unit 68A calculates a reference amplitude Aa1 of the first acceleration a1 and a reference amplitude Aa2 of the second acceleration a2 based on the vibration characteristics (Ra1, Ia1, Ra2, Ia2) from the first reference vibration characteristics calculating unit 64A, and calculates the first reference amplitude amplification ratio G1=Aa1/Aa2 based on these amplitudes. In this case, the reference amplitude Aa1 is $Aa1 = \sqrt{(Ra1^2 + Ia1^2)}$. The reference amplitude Aa2 is $Aa2 = \sqrt{(Ra2^2 + Ia2^2)}$. Alternatively, $G1 = Aa1^2/Aa2^2$ may be used for the first reference amplitude amplification ratio G1. In this case, $Aa1^2 = Ra1^2 + Ia1^2$, and $Aa2^2 = Ra2^2 + Ia2^2$ hold. Consequently, it is possible to omit the arithmetic operation of the square root.

Similarly, the second reference amplitude amplification ratio calculating unit 68B calculates a reference amplitude Ab1 of the first acceleration a1 and a reference amplitude Ab2 of the second acceleration a2 based on the vibration characteristics (Rb1, Ib1, Rb2, Ib2) from the second reference vibration characteristics calculating unit 64B, and calculates the second reference amplitude amplification ratio G2=Ab1/Ab2 based on these amplitudes. In this case, the reference amplitude Ab1 is $Ab1 = \sqrt{(Rb1^2 + Ib1^2)}$. The reference amplitude Ab2 is $Ab2 = \sqrt{(Rb2^2 + Ib2^2)}$. Alternatively, $G2 = Ab1^2/Ab2^2$ may be used for the second reference amplitude amplification ratio G2. In this case, $Ab1^2 = Rb1^2 + Ib1^2$, and $Ab2^2 = Rb2^2 + Ib2^2$ hold. Consequently, it is possible to omit the arithmetic operation of the square root.

These arithmetic operations can be easily performed compared to arithmetic operations of complicated transfer functions and the like. That is, a controller composed of a low-cost processor including a fixed-point arithmetic unit can perform these operations in a smaller number of arithmetic operation steps. As described above, the electric current to be applied to the coil of the electromagnet 20 is adjusted according to the relationship between the amplitude amplification ratios G, G1, G2. Consequently, when the first target amplitude At1, the second target amplitude At2, and the reference amplitudes Aa1, Aa2, Ab1, Ab2 are calculated, it is possible to omit the arithmetic operation of the square root and thus further simplify the arithmetic operation processing.

On the other hand, the amplitude amplification ratio comparing unit 70 compares the target amplitude amplification ratio G from the target amplitude amplification ratio calculating unit 66, the first reference amplitude amplification ratio G1 from the first reference amplitude amplification ratio calculating unit 68A, and the second reference amplitude amplification ratio G2 from the second reference amplitude amplification ratio calculating unit 68B.

The power supply control unit 72 changes the amount of power supply to the electromagnet 20 according to a comparison result from the amplitude amplification ratio comparing unit 70 to change the magnetic force produced by the electromagnet 20. That is, when the comparison result of the amplitude amplification ratio comparing unit 70 is G1>G>G2, the power supply control unit 72 increases the electric current I to be supplied to the electromagnet 20, and increases the magnetic force to be applied to the MREs 18. On the contrary, when the comparison result of the amplitude amplification ratio comparing unit 70 is G1<G<G2, the power supply control unit 72 decreases the current I to be supplied to the electromagnet 20 and decreases the magnetic force to be applied to the MREs 18.

When the comparison result of the amplitude amplification ratio comparing unit 70 is G1<G and G<G2, the power supply control unit 72 maintains a present state of the electric current I to be supplied to the electromagnet 20.

These types of control can be performed based on the comparison result of the amplitude amplification ratio comparing unit 70. Consequently, similar to the above arithmetic operations, the controller composed of the above low-cost processor can perform the arithmetic operations in a smaller number of arithmetic operation steps.

By the way, the change range ΔF of the first reference frequency F1 and the second reference frequency F2 with respect to the target frequency F is preferably adjusted according to the magnitude of attenuation of the MREs 18.

Figure 8:
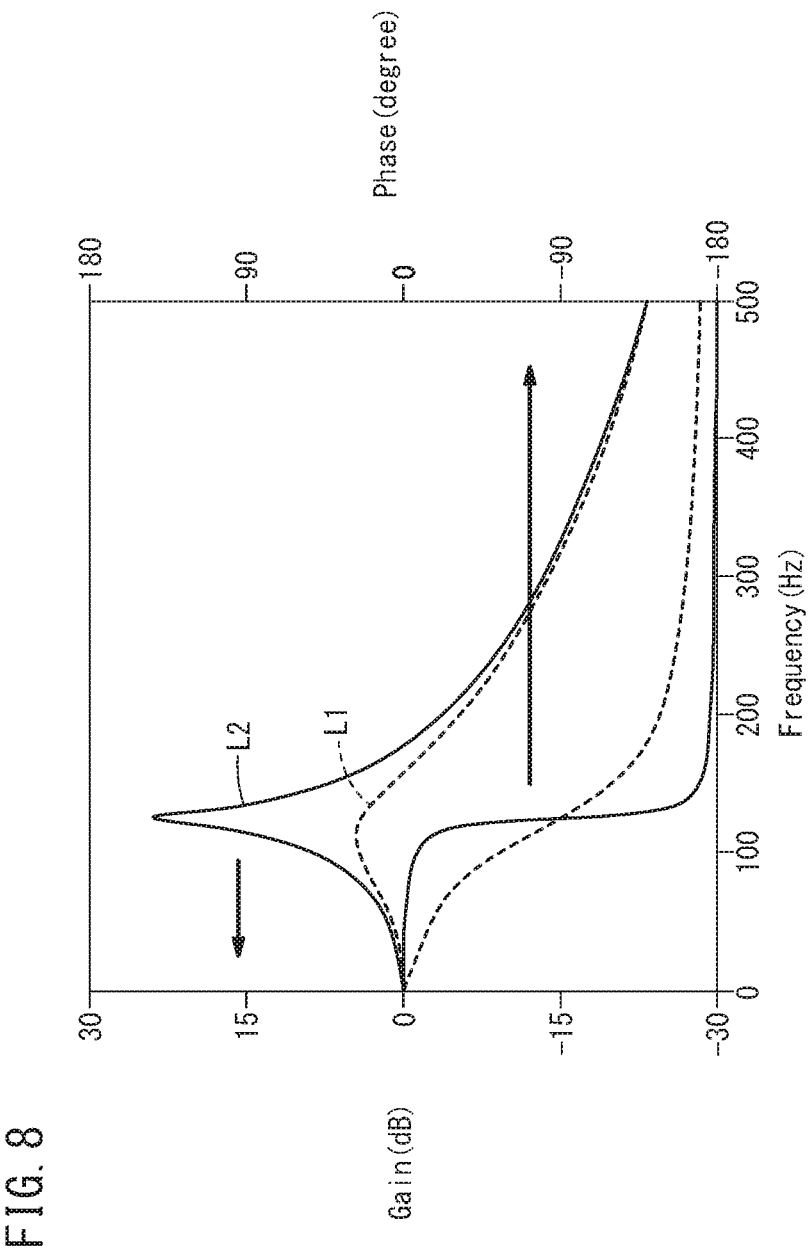
FIG. 8 is a view showing characteristics in a case where attenuation of MRE is larger, and characteristics in a case where attenuation of MRE is smaller.

That is, when the magnitude of the attenuation of the MREs 18 is large as shown in FIG. 8, a peak of a gain (amplitude amplification ratio) is moderate as indicated by a curve L1. Therefore, when ΔF is small, it is difficult to decide the relationship between the target amplitude amplification ratio G, the first reference amplitude amplification ratio G1, and the second reference amplitude amplification ratio G2. Hence, it is preferable to increase the change range.

On the contrary, when the magnitude of the attenuation of the MREs 18 is a little, a peak of a gain (amplitude amplification ratio) is steep as indicated by a curve L2. Therefore, when ΔF is large, it is difficult to decide the relationship between the target amplitude amplification ratio G, the first reference amplitude amplification ratio G1, and the second reference amplitude amplification ratio G2. Hence, it is preferable to decrease the change range.

Next, a second method (second embodiment) will be described with reference to FIGS. 9 to 11B.

The second embodiment uses the substantially same method as the method in the first embodiment yet differs in using the first reference frequency F1 and the second reference frequency F2 without using the target frequency F.

(2-a) The first acceleration sensor 44a detects the acceleration (first acceleration a1) of the movable mass 40. The second acceleration sensor 44b detects the acceleration (second acceleration a2) of the vibration control target member 12 (step S11 in FIG. 9).

(2-b) The target frequency F calculated from the engine rotational speed Ne is calculated. The first reference frequency F1 (=F−ΔF) and the second reference frequency F2 (=F+ΔF) are calculated based on the target frequency F (step S12).

(2-c) Each of the vibration amplitudes Y1, Y2 of the first acceleration a1 at the first reference frequency F1 and the second reference frequency F2 is calculated from the vibration waveform of the first acceleration (a1) (step S13).

(2-d) Each of the vibration amplitudes X1, X2 of the second acceleration a2 at the first reference frequency F1 and the second reference frequency F2 is calculated from the vibration waveform of the second acceleration a2 (step S14).

(2-e) The first reference amplitude amplification ratio G1 (Y1/X1) and the second reference amplitude amplification ratio G2 (Y2/X2) at the first reference frequency F1 and the second reference frequency F2 are calculated (step S15).

(2-f) According to the relationship between the amplitude amplification ratios G1, G2, the electric current to be applied to the coil is adjusted to increase or decrease the rigidity of the MREs by a small amount (steps S16 to 18).

By employing the above method, it is possible to make the eigenvalue of the dynamic damper 38 that uses the MREs 18 follow the target frequency F calculated from the engine rotational speed Ne.

A specific example of processing in (2-f) above will be described with reference to FIGS. 10A to 11B.

Figure 10A:
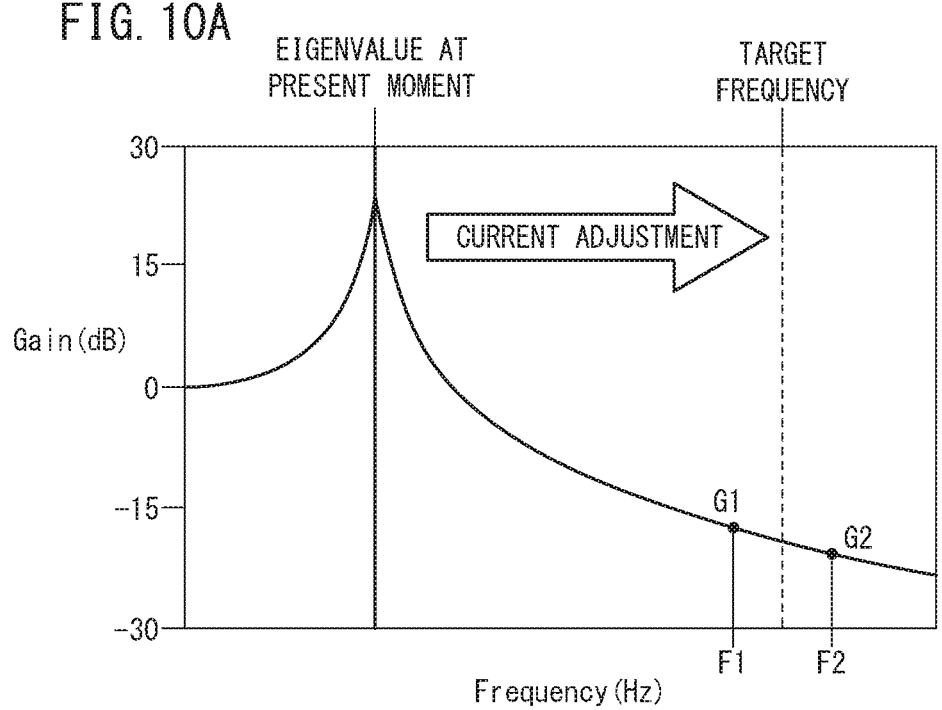
FIGS. 10A and 10B are characteristic diagrams showing two examples where the relationship between the amplitude amplification ratios G1, G2 is G1>G2.
Figure 10B:
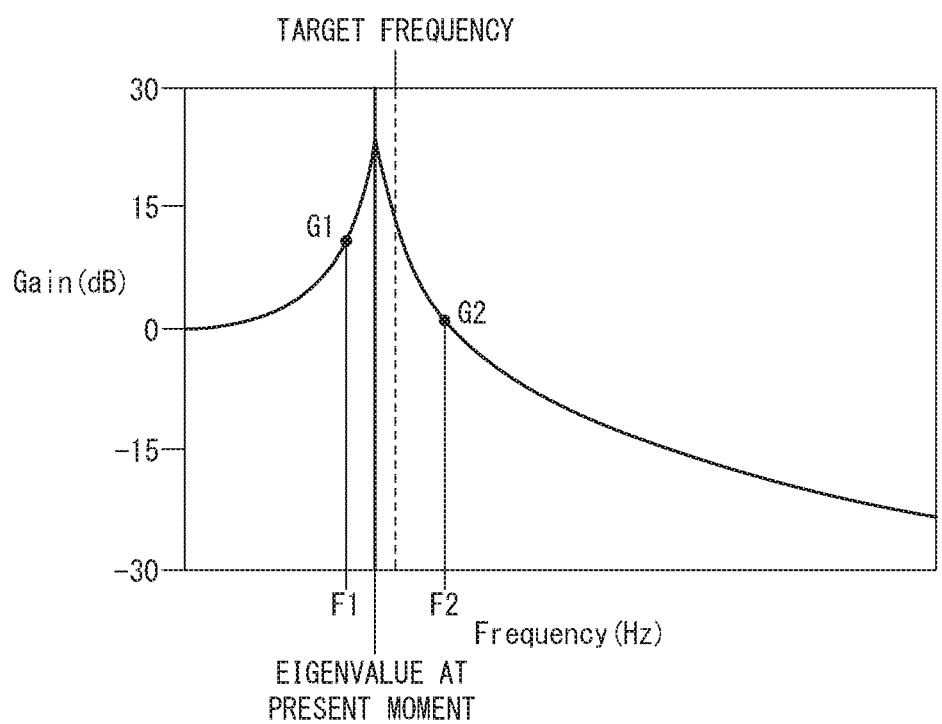

First, as shown in FIGS. 10A and 10B, when the relationship between the amplitude amplification ratios G1, G2 is G1>G2, the electric current to be applied to the coil is adjusted to increase the eigenvalues of the MREs 18 by a small amount (step S16 in FIG. 9). Similar to the first embodiment, in this case too, the magnetic force produced by the electromagnet 20 is increased by the first magnetic force increase amount.

Particularly, in the case of G1<1 (0 dB), the electric current to be applied to the coil is adjusted to increase the eigenvalues of the MREs 18 by a sufficiently large amount (step S17 in FIG. 9). Similar to the first embodiment, in this case too, the magnetic force produced by the electromagnet 20 is increased by the second magnetic force increase amount. The second magnetic force increase amount is equal to the first magnetic force increase amount or more.

Figure 11A:
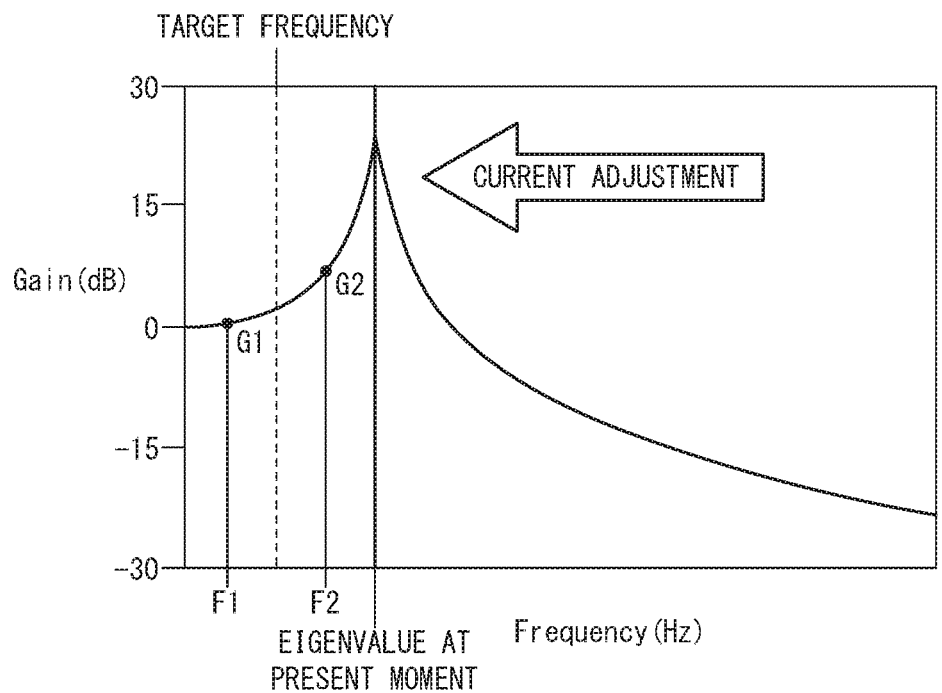
FIGS. 11A and 11B are characteristic diagrams showing two examples where the relationship between the amplitude amplification ratios G1, G2 is G1<G2.
Figure 11B:
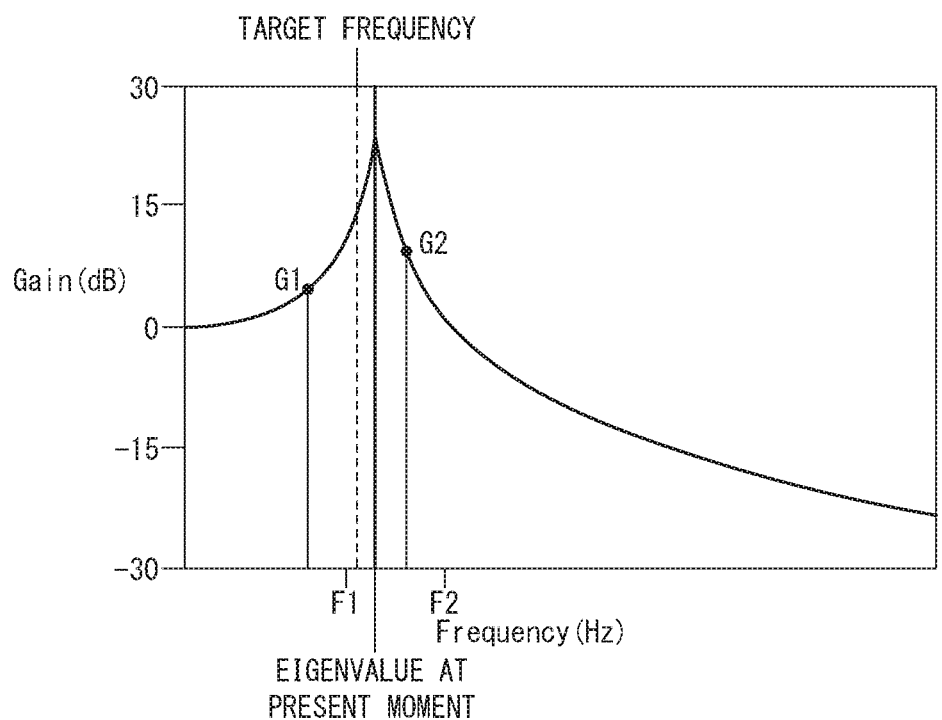

When the relationship between the amplitude amplification ratios G1, G2 is G1<G2 as shown in FIGS. 11A and 11B, the present eigenvalues (rigidity) of the MREs are larger than the target frequency F. Therefore, the electric current to be applied to the coil is adjusted to decrease the eigenvalues of the MREs by a small amount (step S18 in FIG. 9).

According to this second embodiment, it is not necessary to calculate the target amplitude amplification ratio G (Y/X) at the target frequency F. Consequently, it is possible to omit the target standard signal generating unit 56, the target vibration characteristics calculating unit 58, and the target amplitude amplification ratio calculating unit 66 in the target signal processing unit 50. Moreover, the amplitude amplification ratio comparing unit 70 only needs to decide the relationship between the first reference amplitude amplification ratio G1 and the second reference amplitude amplification ratio G2. Consequently, it is possible to simplify the signal processing and increase the response speed compared to the first embodiment.

As described above, the dynamic damper control device 10 according to the present embodiment can realize the control method for changing and adjusting the frequency of the dynamic damper 38 following the problematic vibration frequency (target frequency) by using the controller composed of the low-cost processor including the fixed-point arithmetic unit without using a costly processor such as a DSP (Digital Signal Processor) used when a high-load arithmetic operation such as FFT (Fast Fourier Transform) is necessary. Moreover, the amplitude amplification ratio comparing unit 70 can decide the relationship between the first reference amplitude amplification ratio G1, the second reference amplitude amplification ratio G2, and the third reference amplitude amplification ratio G3. Consequently, it is possible to increase the arithmetic operation speed and make the frequency of the dynamic damper 38 quickly follow the target frequency. It is possible to quickly reduce the vibrations of the vibration control target member 12 at a portion at which the dynamic damper 38 is disposed.

The present invention is not limited to the above embodiments, and can employ various configurations based on the disclosed contents of this description.

What is claimed is:

1. A dynamic damper control device comprising:
   a vibration control target member configured to vibrate according to a vibration source;
   an attachment member coupled to the vibration control target member;
   a magnetorheological elastomer configured to elastically couple the attachment member and a mass member;

an electromagnet configured to produce a magnetic force applied to the magnetorheological elastomer; and an elastic characteristics control unit configured to control power supply to the electromagnet and control elastic characteristics of the magnetorheological elastomer, wherein the elastic characteristics control unit includes a first acceleration obtaining unit configured to obtain a first acceleration of the mass member, a second acceleration obtaining unit configured to obtain a second acceleration of the vibration control target member, and a target amplitude amplification ratio calculating unit configured to calculate a target amplitude amplification ratio of the mass member and the control vibration control target member based on the first acceleration and the second acceleration, and the elastic characteristics control unit is configured to change the magnetic force produced by the electromagnet based on the target amplitude amplification ratio.

2. The dynamic damper control device according to claim 1, wherein:

the elastic characteristics control unit further includes a target frequency determining unit configured to determine a target frequency based on a vibration state of the vibration source, and the target amplitude amplification ratio calculating unit is configured to calculate the target amplitude amplification ratio at the target frequency.

3. The dynamic damper control device according to claim 2, wherein the elastic characteristics control unit further includes a reference frequency determining unit configured to determine a first reference frequency and a second reference frequency based on the target frequency, and a reference amplitude amplification ratio calculating unit configured to calculate a first reference amplitude amplification ratio and a second reference amplitude amplification ratio at the first reference frequency and the second reference frequency based on the first acceleration and the second acceleration, and the elastic characteristics control unit is configured to change the magnetic force produced by the electromagnet based on the first reference amplitude amplification ratio and the second reference amplitude amplification ratio.

4. The dynamic damper control device according to claim 3, wherein:

the reference amplitude amplification ratio calculating unit is configured to set the first reference frequency lower than the target frequency and set the second reference frequency higher than the target frequency; and the elastic characteristics control unit is configured to decrease the magnetic force produced by the electromagnet when the first reference amplitude amplification ratio is smaller than the target amplitude amplification ratio and the second reference amplitude amplification ratio is larger than the target amplitude amplification ratio, and increase the magnetic force produced by the electromagnet when the first reference amplitude amplification ratio is larger than the target amplitude amplification ratio and the second reference amplitude amplification ratio is smaller than the target amplitude amplification ratio.

5. The dynamic damper control device according to claim 4, wherein the elastic characteristics control unit is configured to increase the magnetic force produced by the electromagnet when the first reference amplitude amplification ratio is smaller than a predetermined reference amplitude amplification ratio.

6. The dynamic damper control device according to claim 5, wherein:

the reference amplitude amplification ratio calculating unit is configured to increase the magnetic force produced by the electromagnet by a first magnetic force increase amount when the first reference amplitude amplification ratio is larger than the target amplitude amplification ratio and the second reference amplitude amplification ratio is smaller than the target amplitude amplification ratio, and increase the magnetic force produced by the electromagnet by a second magnetic force increase amount when the first reference amplitude amplification ratio is smaller than the predetermined reference amplitude amplification ratio; and the second magnetic force increase amount is equal to the first magnetic force increase amount or more.

7. The dynamic damper control device according to claim 6, wherein the elastic characteristics control unit is configured to maintain the magnetic force produced by the electromagnet when the first reference amplitude amplification ratio and the second reference amplitude amplification ratio are smaller than the target amplitude amplification ratio or when the first reference amplitude amplification ratio and the second reference amplitude amplification ratio are larger than the target amplitude amplification ratio.

8. A dynamic damper control device comprising:

a vibration control target member configured to vibrate according to a vibration source;

an attachment member coupled to the vibration control target member;

a magnetorheological elastomer configured to elastically couple the attachment member and a mass member;

an electromagnet configured to produce a magnetic force applied to the magnetorheological elastomer; and an elastic characteristics control unit configured to control power supply to the electromagnet and control elastic characteristics of the magnetorheological elastomer, wherein the elastic characteristics control unit includes a first acceleration obtaining unit configured to obtain a first acceleration of the mass member, a second acceleration obtaining unit configured to obtain a second acceleration of the vibration control target member, and a target frequency determining unit configured to determine a target frequency based on a vibration state of the vibration source, a reference frequency determining unit configured to determine a first reference frequency and a second reference frequency based on the target frequency, and a reference amplitude amplification ratio calculating unit configured to calculate a first reference amplitude amplification ratio and a second reference amplitude amplification ratio at the first reference frequency and the second reference frequency based on the first acceleration and the second acceleration, the elastic characteristics control unit is configured to change the magnetic force produced by the electromagnet based on the first reference amplitude amplification ratio and the second reference amplitude amplification ratio.

9. The dynamic damper control device according to claim 8, wherein:
the reference amplitude amplification ratio calculating unit is configured to set the first reference frequency lower than the target frequency and set the second reference frequency higher than the target frequency; and
the elastic characteristics control unit is configured to
decrease the magnetic force produced by the electromagnet when the first reference amplitude amplification ratio is smaller than the second reference amplitude amplification ratio, and
increase the magnetic force produced from the electromagnet when the first reference amplitude amplification ratio is larger than the second reference amplitude amplification ratio.

10. The dynamic damper control device according to claim 9, wherein the elastic characteristics control unit is configured to increase the magnetic force produced by the electromagnet when the first reference amplitude amplification ratio is smaller than a predetermined reference amplitude amplification ratio.

11. The dynamic damper control device according to claim 10, wherein:
the reference amplitude amplification ratio calculating unit is configured to
increase the magnetic force produced by the electromagnet by a first magnetic force increase amount when the first reference amplitude amplification ratio is larger than the second reference amplitude amplification ratio and
increase the magnetic force produced by the electromagnet by a second magnetic force increase amount when the first reference amplitude amplification ratio is smaller than the predetermined reference amplitude amplification ratio; and
the second magnetic force increase amount is equal to the first magnetic force increase amount or more.

* * * * *